(12) United States Patent
Chi

(10) Patent No.: US 8,654,390 B1
(45) Date of Patent: Feb. 18, 2014

(54) LENTICULAR PRINT AND METHOD OF CREATING

(76) Inventor: Robert Chih-Jen Chi, Kinburn (CA)

( * ) Notice: Subject to any disclaimer, the term of this patent is extended or adjusted under 35 U.S.C. 154(b) by 647 days.

(21) Appl. No.: 12/879,099

(22) Filed: Sep. 10, 2010

(51) Int. Cl.
  *G06F 3/12* (2006.01)

(52) U.S. Cl.
  USPC ............................ 358/1.18; 358/1.13; 348/59

(58) Field of Classification Search
  USPC .................................. 358/1.18, 1.13; 348/59
  See application file for complete search history.

(56) References Cited

U.S. PATENT DOCUMENTS 4,776,026 A * 10/1988 Ueyama ........................ 382/297
5,633,719 A * 5/1997 Oehlbeck et al. ............. 356/401
2003/0058335 A1 * 3/2003 Tajika et al. .................... 348/59

* cited by examiner

*Primary Examiner* — David K Moore
*Assistant Examiner* — Andrew H Lam
(74) *Attorney, Agent, or Firm* — Gulf Coast Intellectual Property Group (57) ABSTRACT

A lenticular print and method of producing that substantially reduces progressive pixel misalignment to produce a lenticular print that has increased angular resolution. The lenticular print includes a dot matrix pixel arrangement that is rotated with respect to the X-Y axis of a printer. The printed output of the rotated dot matrix pixel arrangement requires substantially no re-sampling interpolation. The lenticular print includes a conventional lenticular sheet having a plurality of convex shaped lenticular elements wherein the axis of the lenticular elements are substantially aligned with the axis of the pixel direction.

5 Claims, 6 Drawing Sheets

LENTICULAR PRINT AND METHOD OF CREATING

FIELD OF THE INVENTION

The present invention relates to lenticular imaging, more specifically but not by way of limitation, a method utilized to create a lenticular print from an multi-frame image compiled from a plurality of images from varying lateral angles wherein dot matrix sample points of the multi-frame image are printed onto a printing substrate at an angle between 0 and 90 degrees (exclusive) with respect to the printer's X-Y (horizontal and vertical) axis.

BACKGROUND

Lenticular imaging is a method known to those skilled in the art to compose a series of multiple images or frames onto the focal plan of an array of lenticular lenses so when a viewer views the image through the array of lenses from a particular distance and angle, the viewer will only see one of the multiple images or frames behind the array of lenses. This method is used to form applications such as but not limited to animation transition of images that occurs when a viewer of the lenticular image alters their viewing angle. The method creates the ability for a viewer to view different images from different angles on a printed media having multiple images behind a lenticular sheet which is known for creating autosteroscopic images for a pair of eyes having a small differential between the viewing angle of each eye. A three-dimensional image using lenticular arrays under this principle is, also known as stereoscopic printing. Stereoscopic prints utilize a process that employs a plurality of lenticular lenses to permit the viewer of the image to perceive the image stereoscopically. This type of image is routinely used to make posters or advertisement prints more conspicuous to the viewer, most often for the purpose of promoting a product or service. Traditional lenticular prints are produced by dividing images of the same object that have been acquired at different angles into vertical strips and arraying the strips onto the back of lenticular lenses, or a printing substrate, such that the strips are positioned in general axial alignment with the half-cylindrical shape of the lenticular lenses.

There are many problems with the current technology that is utilized to create a lenticular print. Currently, multiple frames are captured of the same object and are combined into vertical strips to create a composite image using a process called interlacing. Each vertical strip is aligned with a lenticular sheet having a plurality of lenticular elements such that the vertical strips of the composite image are substantially axially aligned with the lenticular elements. One problem with this current method is that the vertical strip pitch must be properly aligned with and precisely matching the lenticular sheet's lentical element pitch in order for the image to be synchronized over the range of lentical elements from a given viewing position. If the vertical strip pitch is misaligned with the lenticular sheet's lentical pitch an effect known to those skilled in the art as, ghosting, will occur. Ghosting occurs due to poor treatment of the source images, more specifically the improper matching of the physical parameters of frames viewing distance and viewing angles, and can further be attributed to transitions where demand for an effect goes beyond the limits and technical possibilities of the printer. This causes some of the images to remain visible when they should disappear. These negative effects can depend on numerous conditions such as, but not limited to, the lighting of the lenticular print or mismatch of vertical strip pitch and lentical pitch.

An additional shortcoming of the current technology of lenticular prints involves the horizontal printer pixel pitch. Currently in the printing industry, printers have a certain resolution specification also known as dot pitch or dot per inches. The horizontal printer dot pitch is a specification of the distance between the dot samples points of the same color for which a printer can natively print. To create a color image, multiple dots from different colorants form a group of dot arrangement pattern to represent a single image pixel. The native smallest pixel to pixel pitch is thus determined by the dot per inches of a given printer. Conventional printing technology utilizes a checker board image style pixel arrangement in an X-Y coordinate system. As previously mentioned herein, for a lenticular print, the frames utilized to create the interlaced image are vertically divided into strips. The amount of vertical strips are based on the number of half-cylindrical shaped lenses of the lenticular sheet to be utilized as well as the number of frame behind each lens element. The combination of the limitation of the horizontal printer pixel pitch,ppp, and the lens element pitch,lep, function to limit the angular resolution of the image by capping the maximum number of frames,mnf, that can be printed in a lenticular print with the relationship of mnf=<lep/ppp wherein mnf is typically not a natural number.

However, the requirement to synchronize across a wide range of lenticular lens elements for the printed group frame strip to match the lens element pitch from a given viewing distance is needed to prevent the ghosting problem but this requires that lep/ppp be a natural number. When attempting to synchronize spatially between two periodical functions with two unmatched pitches, wherein unmatched pitches occurs when one pitch is not a whole number multiplication of the other pitch, and the error will accumulate of a period of spatial width resulting in a need for correction. As is known in the art, two methods are employed to facilitate correction, first an adding/dropping method can be used and secondly an interpolation and re-sampling method is utilized. The adding/dropping method utilizes a repeat correction by either adding or dropping one or more elements from the small pitch group periodically when the error accumulates to over one pitch of the smaller pitch in two periodical functions in order to maintain in sync with larger pitch. One problem with this method is that the method inevitably creates a spatial banding effect causing a undesired visual disturbance.

Another method of attempting to reduce the spatial banding effect involves a method where an interpolation and re-sampling needs to be used so that an envelop function, which composed of multi-angle and multiple frames of images wherein the envelop function is normalized so that pitch is equal to lens element pitch will need to be interpolated and re-sampled with a different printing pitch, i.e. printing resolution. Unfortunately, this method will create significant artifacts and error when the corresponding number of frames utilized, or the lep/ppp mapping is not a significantly large number, which is common in the industry.

Current technology utilizes a calibration procedure to attempt to overcome this pitch mismatch problem when calibrating between a printer, printer pixel pitch and the lens element pitch. As is known in the art, a calibration is performed by printing a test pattern that consists of vertical strips with different horizontal pitches and then overlap the lenticular sheet to determine if the resulting pattern is homogeneous from a desired viewing distance. Using this process, the actual pixel per inch needed is calculated to produce a composite multi-frame pattern that will match the physical pitch of the half-cylindrical shaped lenses of the lentical sheet. This calibration procedure modifies the desired printout resolution to a resolution that is non-native to the printer's capability. When attempting to print a lenticular image using a pixel resolution that is non-native to the printer's physical pixel resolution it can cause the printing software or firmware to either re-sample the original composite multi-angle pattern by interpolation between pixels and/or perform periodic addition or subtraction of pixels. Both scenarios described will cause either degradation, distortion or a progressive misalignment that will repeatedly appear in the lenticular print as a band.

The application of lenticular print to create a three dimensional view of an object is traditionally limited by the number of views achievable utilizing a traditional interlaced strip method behind a lenticular element which causes an irregular transition effect from one viewing angle to an adjacent viewing angle.

Accordingly, there is a need to provide a method for producing a lenticular print overcomes the above shortcomings, including a method that substantially reduces the effects of ghosting and offers increased horizontal angular resolution of the final lenticular print.

SUMMARY OF THE INVENTION

It is the object of the present invention to create a lenticular print that is created utilizing a method that compiles a multi-frame image and converts the multi-frame image into a dot matrix pixel arrangement that is subsequently rotated against the X-Y (horizontal and vertical) axis of a printer prior to printing.

Another object of the present invention is to create a lenticular print that is created utilizing a method that substantially eliminates pixel progressive misalignment.

An additional object of the present invention is to create a lenticular print that is created utilizing a method that rotates the dot matrix sample points of a composite multi-frame image that will reduce the interframe pixel pitch distance.

Yet a further object of the present invention is to create a lenticular print that is created utilizing a method that rotates the dot matrix sample points of a composite multi-frame image in order to substantially prevent interpolation between pixels.

Still another object of the present invention is to create a lenticular print utilizing a method that rotates dot matrix sample points of a composite multi-frame image to facilitate an increased number of frames placed into the provided lentical element pitch of the lenticular sheet.

A further object of the present invention is to create a lenticular print utilizing a method that rotates dot matrix sample points of a composite multi-frame image wherein the frames of the composite multi-image image are captured by one camera moving horizontally at a substantially constant speed and having a substantially constant frame capture rate.

An additional object of the present invention is to create a lenticular three dimensional image print that is comparable to a holograph print.

Still another object of the present invention is to create a lenticular three dimensional print that upon viewing will not appear to float or drift as the viewer alters their viewing angle laterally.

Yet another object of the present invention is to create a method to form a lenticular three dimensional print that rotates dot matrix sample points of a composite multi-frame image wherein the high density of the frame counts achieve an improved three dimensional effect.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated a lenticular print 100 constructed according to the principles of the present invention.

Figure 1:
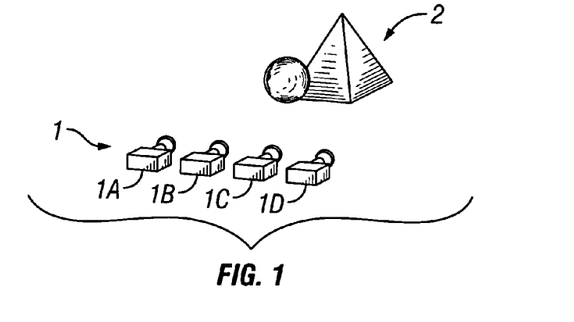
FIG. 1 is illustrates a method of acquiring images of a subject with the use of a camera.
Figure 1B:
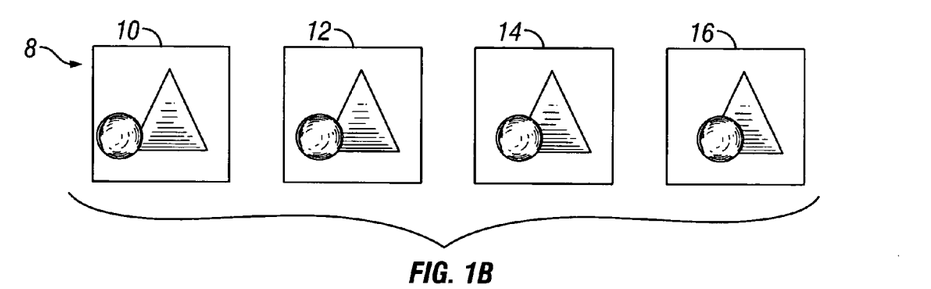
FIG. 1B is a illustrates the different images acquired from the various angles of the camera with respect to the subject.
Figure 2:
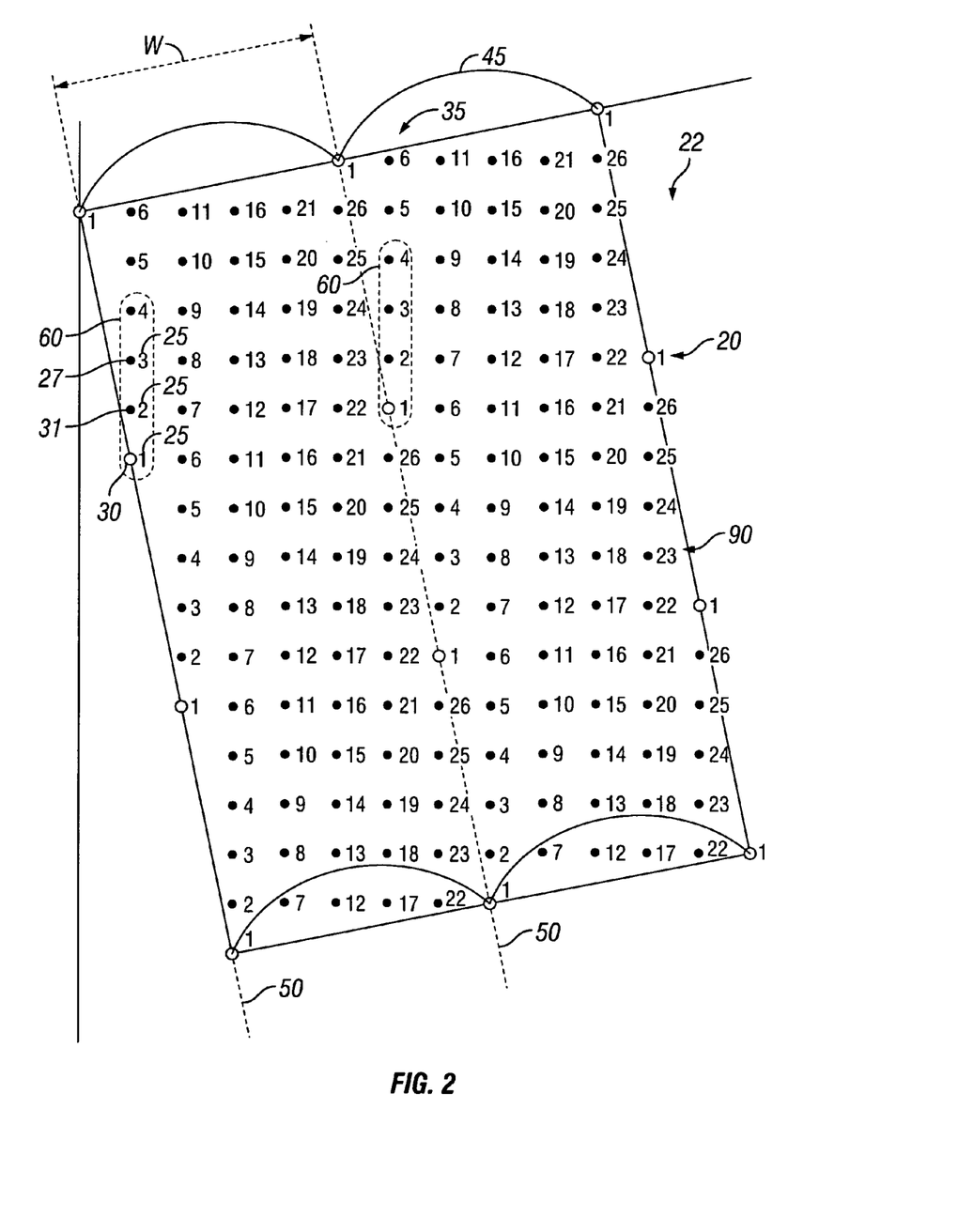
FIG. 2 is a top view of a dot image print with lenticular elements superposed thereon.
Figure 3:
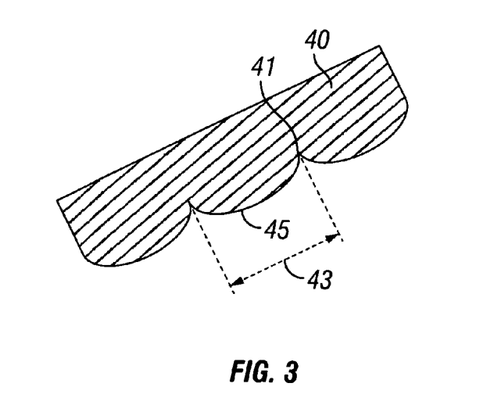
FIG. 3 is a top view of a lenticular sheet.
Figure 4:
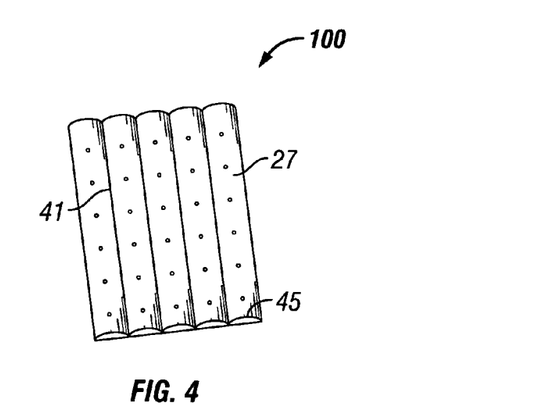
FIG. 4 is a perspective view of a lenticular print.

Illustrated in FIG. 1 is a subject 2 and a camera 1 shown in a plurality of positions 1A, 1B, 1C and 1D wherein the plurality of positions 1A, 1B, 1C and 1D graphically depict where the camera 1 is located to acquire an image to be stored using conventional methods within the memory of the camera 1. The camera 1 in its plurality of positions 1A, 1B, 1C and 1D changes its horizontal angle (also to be construed as single planar angle) with respect to the subject 2 as a result of the camera's 1 change in position. The camera 1, in an exemplary setting, is not tilted or rotated in any other manner and as with conventional image capture wherein the images will be compiled to form a lenticular print, the only angle of change is planar angle between the camera 1 and the subject 2 as described herein. It is contemplated within the scope of the present invention that the camera 1 could be rotated toward the subject 2 in order to maintain the subject 2 within the field of view of the camera 1. Shown in FIG. 1B are the exemplary images 8 acquired by the camera 1 in the plurality of camera positions 1A, 1B, 1C and 1D. The exemplary captured frame 10 illustrates the image of the subject 2 captured by the camera 1 in camera position 1A. Exemplary captured frame 12 illustrates the image of the subject 2 captured by the camera 1 in camera position 1B, exemplary captured frame 14 illustrates the image of the subject 2 captured by the camera 1 in camera position 1C and exemplary captured frame 16 illustrates the image of the subject 2 captured by the camera 1 in camera position 1D. The exemplary captured frames 10, 12, 14 and 16 are combined utilizing software to form a composite multi-frame image 20, as shown in FIG. 2, with pixel dot matrix sample points 27 extracted from the exemplary captured frames 10, 12, 14 and 16 compiled from the plurality of camera positions 1A, 1B, 1C and 1D. While in FIG. 2 approximately twenty six plurality of camera positions 1A, 1B, 1C and 1D were used to create the pixel dot matrix sample points 27, those skilled in the art should recognize that a significantly large number of camera positions 1A, 1B, 1C and 1D could be used.

Figure 7:
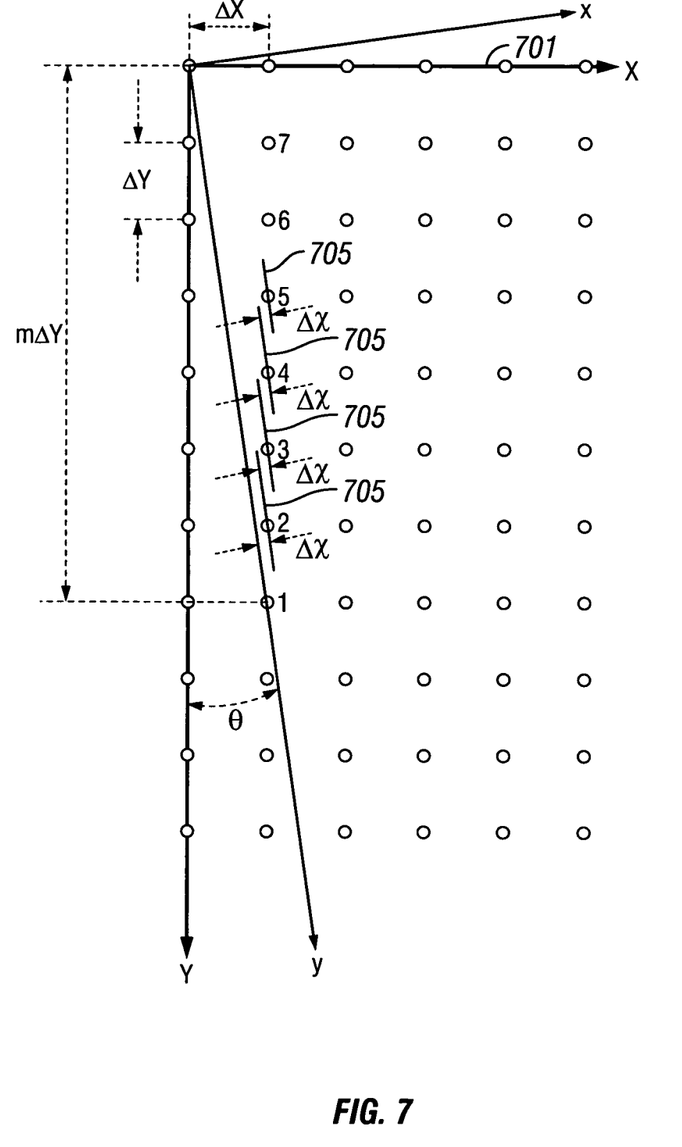
FIG. 7 is an illustration of the dot matrix pixel arrangement of the present invention.

It is contemplated within the scope of the present invention that more than one camera 1 could be utilized to capture images of the subject 2 from a plurality of different positions on the same plane. Additionally, it is further contemplated within the scope of the present invention that the camera 1 could be placed on a track or similar device that has the capability to move laterally at a constant rate of speed to facilitate the camera 1 capturing exemplary images 8 at a variety of angles wherein the exemplary images 8 captured are acquired at approximately equivalent intervals. Furthermore, it is contemplated within the scope of the invention that the exemplary images 8 could be captured by a conventional motion camera wherein the frames of the motion picture are later separated and selected to be combined into a single composite multi-frame image 20. While only four exemplary images 8 are illustrated herein, those skilled in the art will recognize that numerous different quantities of exemplary images 8 could be captured of the subject 2 to create the composite multi-frame image 20. The exemplary captured frames 10, 12, 14 and 16 are transferred to a computing device to be processed into a dot matrix pixel arrangement 90 utilizing an image pixel manipulated extraction algorithm known to those skilled in the art so as to sample the image pixels in a x-y direction from each exemplary captured frame 10, 12, 14 and 16. Depending on the total desired number of exemplary frames needed these sampled pixels are placed sequentially on the corresponding composite image pixel location on a rotated orientation dot matrix pixel pattern 90 as illustrated in the composite multi-frame image 20. Those skilled in the art will recognize that the exemplary captured frames 10, 12, 14 and 16 could be transferred from the camera 1 to a computing device utilizing numerous suitable methods. To create the multi-dimensional lenticular print 100, the exemplary captured frames 10, 12, 14 and 16 are processed within a computing device to create a dot matrix pixel arrangement 90 that will be printed on a suitable substrate 22 to form the composite multi-frame image 20. As shown in FIG. 2, the indicia 25 represents pixel dot matrix sample points 27 of the images 8 captured by the camera 1. For example, the point 30 labeled with indicia 0.01, represents pixel dot matrix points sampled from exemplary captured frame 10 wherein the camera 1 was in camera position 1A. The point 31, labeled with indicia 0.02, represents pixel dot matrix points sampled from the exemplary captured frame 12 wherein the camera 1 was in camera position 1B. This process continues such that dot matrix sample points 27 for all frames are generated in the final composite image for mapping to a printer's highest resolution pixel by pixel and subsequently printed on the substrate 22. The pixel dot matrix sample points 27 are generally quasi-square in shape and consist of multi-ink droplets. Those skilled in the art will recognize that the pixel dot matrix sample points 27 could be shaped in other forms and still achieve the desired function as described herein. The pixel dot matrix sample points 27 form a composite image and are in a rotated orientation as a result prior to output to a printer and are subsequently printed at the printer's native resolution to yield a rotated orientation composite multi-frame image 20 with respect to the X-Y axis of a conventional printer onto the printing substrate 22. While no specific angle of rotation of the pixel dot matrix sample points 27 is required for morphing or animating a lenticular print, good results have been achieved printing the pixel dot matrix sample points 27 on the printing substrate at an angle range between 0 and 10 degrees inclusive. In order to achieve good results, of a three dimensional lenticular print, the pixel dot matrix sample points 27 are arranged behind the lenticular element 45 so that when a viewer views the composite multi-frame image 20 through the lenticular sheet 40 from a given distance, the direction of viewing that is for the dot matrix sample point 27 corresponds to the same direction of the camera 1 capturing the subject 2. The subject 2 can be scaled up or down in a three-dimensional space and the viewing distance can be scaled proportionally in the same ratio such that the paralleled direction of a give point and corresponding pixel dot matrix sample point 27 will be maintained and thus reproduce the direction of the dot matrix sample point's 27 viewing direction. The rotation of the pixel dot matrix sample points 27 decreases the interframe pixel pitch distance. As shown in particular in FIG. 8 the printer's X direction 801 respect to rotation angle $\theta$ of the composite image x direction needs to satisfy condition of $\tan \theta = (n/m)(\Delta X/\Delta Y)$ where m and n are natural numbers. For illustration purposes, if n=1 then this will reduce the FIG. 8 to FIG. 7. Additionally, as shown in FIG. 7, $\Delta x = \Delta Y \sin \theta$, wherein $\Delta x$ is interframe pixel pitch 705 such that the smaller the $\theta$, the smaller the $\Delta x$. In order to balance the dot matrix pixel method, $m\Delta Y \sec \theta$ should be kept approximately equal to the lenticular element pitch so as to yield a balanced resolution in both the x and y direction. For example, a total number of frames ($n_0$) is used to match the lenticular element pitch, lep, i.e. $n_0 * \Delta x = lep$. There exists $n_0 * \Delta Y * \sin \theta = lep$ that matches the pitch with a whole number of frames having a larger $n_0$ upon $\theta$ being a small angle. When $\theta$ is a small angle, $\Delta x = \Delta Y \sin \theta$ is significantly smaller than $\Delta X$ and presuming the same lep a higher $n_0$ is achieved. The total achievable maximum number of frames is $n_0 = lep/\Delta X$ under traditional interlaced strip arrangement but $lep/\Delta X$ may not be a whole number and since $lep/\Delta X = N_1 + (lep - N_1 \Delta X)/\Delta X$ where $N_1$ is an integer and $0 < (lep - N_1 \Delta X)/\Delta X < 1$ and the matching error $E_1 = lep - N \Delta X < \Delta X$ can be as large as $\Delta X$. Additionally, in percentage format the $E_1/lep*100\%$ can be as large as $\Delta X/lep*100\%$. An exemplary rotation of a pixel dot matrix sample points 27, $lep/\Delta x = lep/(\Delta Y * \sin \theta) = N_2 + (lep - N_2 \Delta Y \sin \theta)/\Delta Y \sin \theta$. $N_2$ is an integer and $0 < (lep - N_2 \Delta Y \sin \theta)/\Delta Y \sin \theta < 1$. The matching error $E_2 = lep - (N_2 \Delta Y \sin \theta) < \Delta Y \sin \theta$. Additionally in percentage format, $E_2/lep*100\%$ is no larger than $(\Delta Y \sin \theta/lep)*100\%$. From the exemplary discussion herein a reduced spatial mismatching error can be achieved and thus an improved resolution. An add/drop frame pixel in order to maintain synchronization will impact visual effects less significantly thereby reducing visible among different frames the banding effect discussed herein and thus the need to perform interpolation pixels is substantially eliminated. A conventional add/drop of a frame can be used to maintain spatial synchronization. The decrease of interframe pixel pitch distance 705 facilitates the placement of more exemplary captured frames 10, 12, 14, 16 within a given pitch distance 43 of a lenticular element 45.

As is known in the art, lenticular prints 100 utilize an overlay of a lenticular sheet 40 superposed on a suitable printing substrate 22 or alternatively by directly printing on the focal plane. The lenticular sheet 40 is comprised of a plurality of lenticular elements 45 that are generally parallel and half-cylindrical in shape. The lenticular elements 45 have a specified width, also known as pitch distance 43. The lenticular sheet 40 can be manufactured to be comprised of lenticular elements 45 that have a variety of different lentical element pitch distances 43. Each lenticular sheet 45 consists of a plurality of lenticular elements 45 that have the same pitch distances 43. The lenticular sheet 40 is superposed the printing substrate 22 such that the edges 41 of the lenticular elements 35 are in substantial axial alignment with the illustrated axis 50 of pixel dot matrix sample points 27. As the pixel dot matrix sample points 27 are rotated with respect to the printer X-Y axis, this allows more exemplary captured frames 10,12,14,16 to be placed within a limited lenticular element pitch distance 43.

Figure 5:
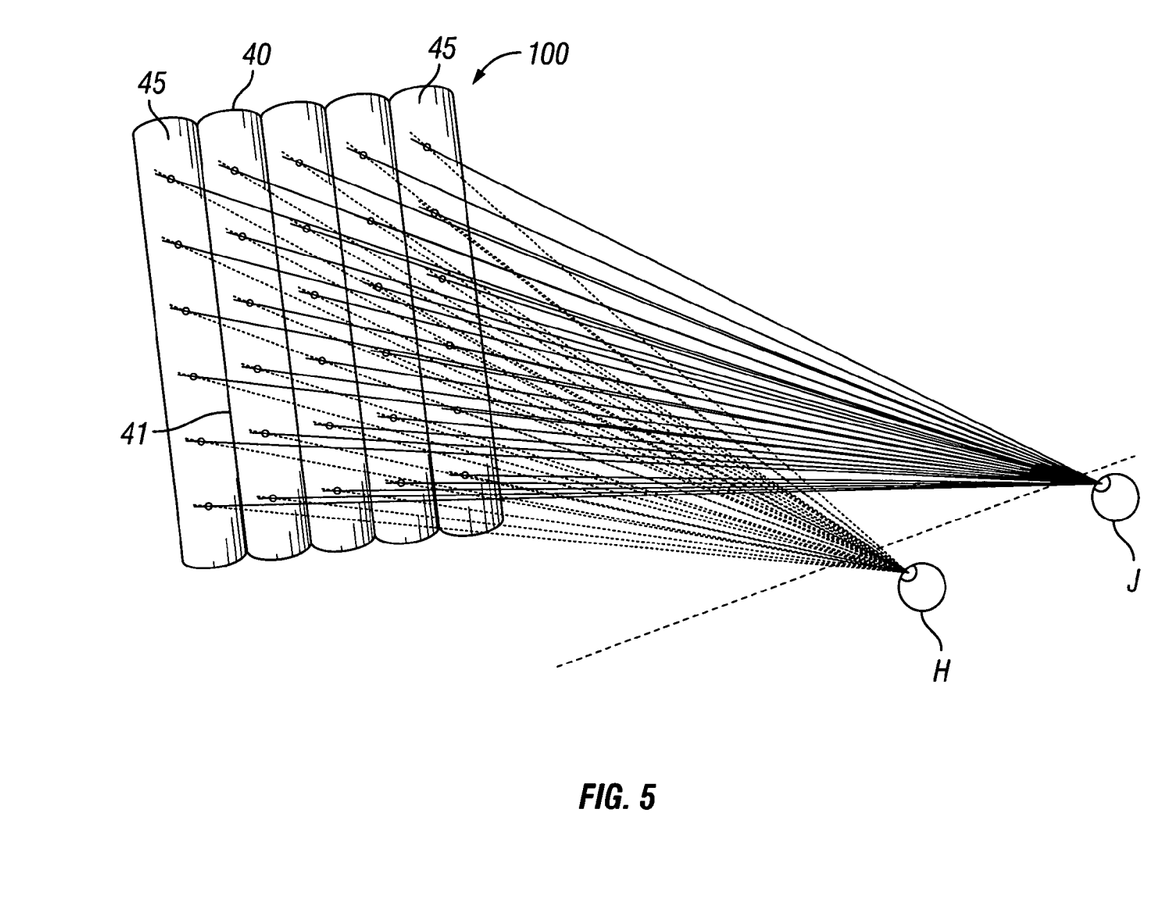
FIG. 5 illustrates exemplary viewing positions of the lenticular print.

The advantage of placing more captured frames within a given lenticular element pitch distance 43 provides a smoother image transition for the viewer of the multi-angle or three-dimensional lenticular print 100. Additionally, as more dot matrix sample points 27 extracted from a greater number of captured frames can be placed within a lenticular element pitch distance 43, the angular resolution in the multi-angle lenticular print 100 is increased. More specifically but not by way of limitation, a group 60 of pixel dot matrix sample points 27, in FIG. 2, represent four extracted pixel dot matrix sample points 27 from four separate captured frames. As the group 60 is rotated against the X-Y axis of the printer, it allows the placement of more pixel dot matrix sample points 27 to be placed within the pitch distance 43 of a lenticular element 45 than if the pixel dot matrix sample points 27 where printed on the substrate 22 in a direction generally parallel with the X axis of the printer as the pixel dot matrix sample points 27 overlap. Additionally, the rotation of the dot matrix pixel arrangement 90 allows a greater number of frames to be placed within the width of a provided lenticular element 45 wherein the number of frames can exceed the lentical pitch divided by the printer pixel pitch so as to facilitate a smooth viewing transition between viewing angles. Those skilled in the art will recognize that printer pixel pitch is a specification for a printer that describes the distance, for example, between pixels. One skilled in the art should recognize that the amount of pixel dot matrix samples 27 that can be printed within a provided pitch distance 43 of a lenticular element 45 will be dependent upon the angle at which the orientation of the composite multi-frame image 20 is rotated with respect to the X-Y axis of a printer and the width of the provided lenticular element 45. Referring now in particular to FIG. 5, the optical effect of the lenticular sheet 40 is discussed. As shown in FIG. 5 when the composite multi-frame image 20 is viewed through the lenticular sheet 40, at least a portion of the composite multi-frame image 20 can be seen as enlarged.

Figure 8:
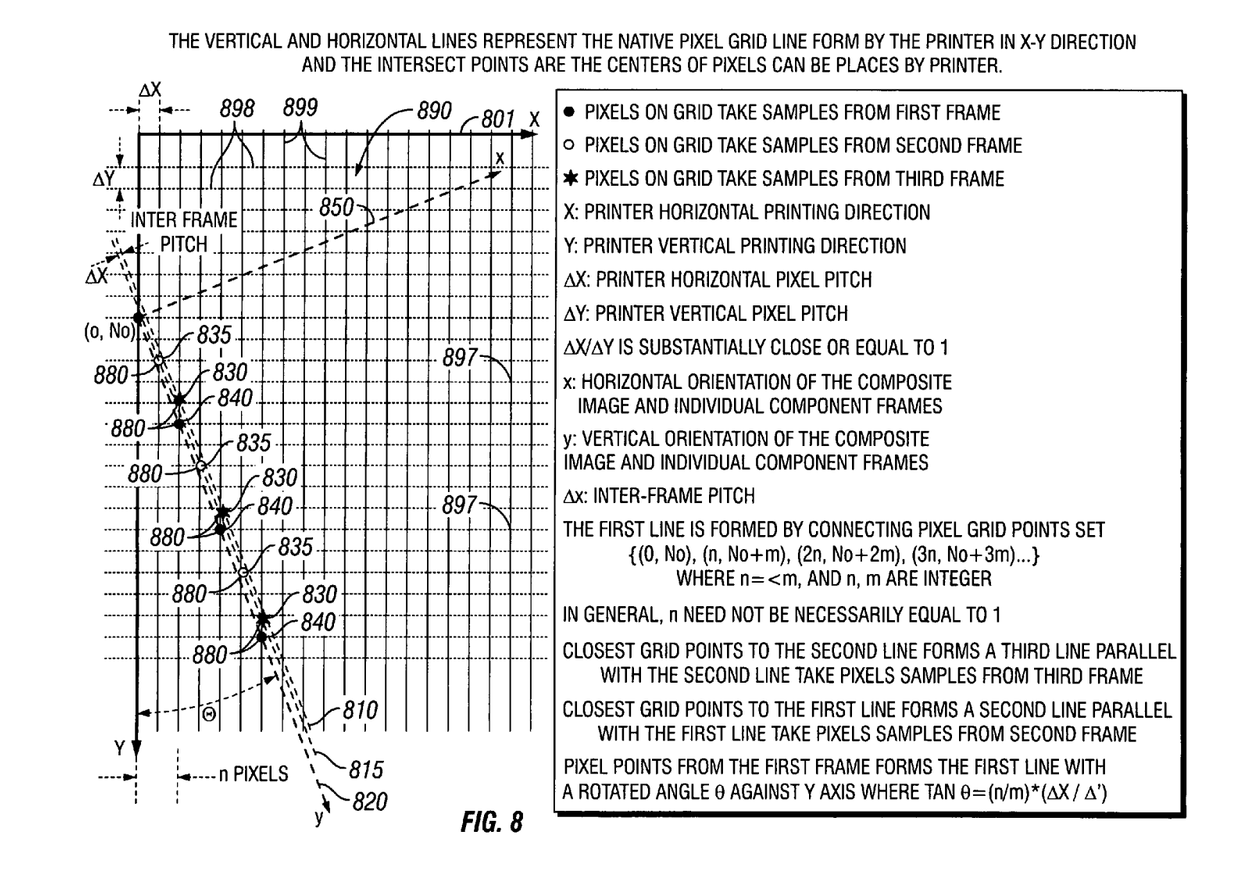
FIG. 8 is an illustration of the dot matrix pixel arrangement of the present invention against a native X-Y grid line for a printer.

The dot matrix pixel arrangement illustrated in FIG. 2 illustrates dot matrix sample points 27 using twenty six captured frames 10 frame placed under two lenticular elements 45. The dot matrix sample point 27 extracted from first captured frame 10 is placed at the printer's X-Y pixel coordinate number of (0, No) in the upper left corner, and then the printer's X-Y pixel coordinate number (1, No+5), (2, No+10), (3, No+15) (4, No+20) . . . (i, No+5i), where i is a natural number and the pixels are sampled from a column of the first captured frame 10 frame in FIG. 1B, and where i is also the number of y-direction samples from same frame. Also, as illustrated in FIG. 2, the printer's X-Y pixel coordinate number (5, No−1), (6, No−1+5), (7, No−1+10), (8, No−1+15), (5+i, No−1+5i) is taken from the same frame, but from the second column of sampled points, and ensuing (10, No−2), (11, No−2+5), (12, No−2+10), (10+i, No−2+5i) from the third sampled column of sampled points. This process continues for the 4$^{th}$ column of sampled points, 5$^{th}$ column of sampled points and continues until all desired samples are taken. Under the desired scaling of sample points, the process creates a dot-matrix sample point 27 from the first captured frame 10 and then rotates at a small angle and be placed in the special composite image arrangement as in FIG. 5. Once the first captured frame 10 dot matrix sample point 27 sampling and placement is done, the process continues for the dot matrix sample point 27 extract from the second captured frame and all additional captured frames 10, wherein each frame, is a one pixel offset in Y-direction from the previous frame as in the example of n=1 as shown in FIG. 8. If in an alternative circumstance such that n is not equal to 1, it will take the closest grid points to the first frameline to form the next frame dot pixel points as illustrated in FIG. 8. It is contemplated within the scope of the present invention that at least the first frame and last frame may be a blank frame that contains only white pixel in order to isolated frames in between so that when a viewer is improperly position in the transition zone, the viewer is aware of the white pixel, prompting a move of their head in a generally left or right direction so as to be placed in a proper position and see the frame information as intended.

The process of extracting dot matrix sample points 27 from an exemplary captured frame 10 and rotating at an angle range of 0-10 degrees and mapping to the composite image location can be executed in an automated software to perform the routing task and pixel arrangement. Subsequent being outputted to the printer, the printer will print in its native highest resolution, and yield a rotated orientation composite multi-frame image 20. A lenticular sheet 40 is overlapped the printing substrate 22 such that the alignment of the lenticular element 45 axis is parallel to the pixel direction extracted from the same column of the each frame. The lenticular element 45 axis has the same angle direction with respected to the printer's Y direction.

To properly create a three-dimensional object image in the lenticular prim 100, it is also important to match a corresponding reference point of the subject 2 during sampling from the exemplary captured frames 10 alignment. The sampling area from different frames will have a relative common reference feature point that will be placed in the neighborhood pixels that sampled from the all frames. Subsequently, it is then become merged into a three-dimensional image point that has an appeared position right on the plan of the lenticular element 45 optical center.

Figure 6:
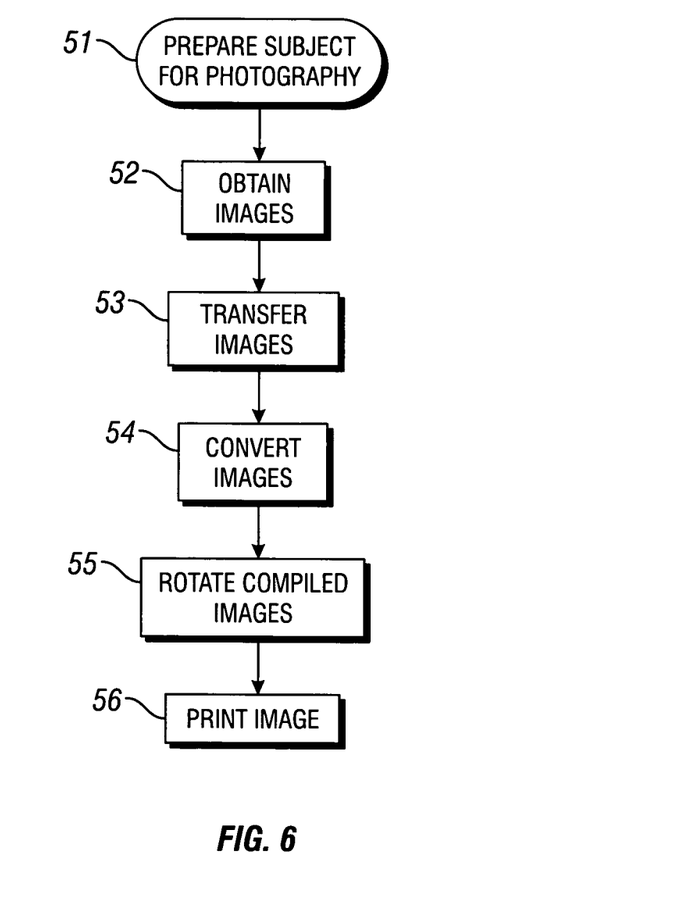
FIG. 6 is a high level flow chart of the method of the present invention.

A flowchart of the overall method of creating a lenticular print 100 is illustrated in FIG. 6. As shown in particular in FIG. 6, step 1, S1 involves preparing a subject to be photographed. Those skilled in the art will recognize that numerous different techniques can be utilized to prepare a subject 2 for photography such as but not limited to lighting. Step 2, S2 of the method of the present invention to create a lenticular print 100 is to obtain at least more than one exemplary image 8 utilizing a plurality of camera positions or cameras as previously described herein. Subsequent step 2, the exemplary images 8 are transferred from the camera 1 to a suitable computing device in step 3,S3. Those skilled in the art will recognize that numerous different types of computing devices could be used wherein the computing devices have sufficient programs/algorithms configured to receive a plurality of images. Ensuing the exemplary images 8 being transferred to a suitable computing device, the exemplary images 8 are compiled into using conventional computing processes and software into a dot matrix pixel arrangement 90 in step 4, S4. The rotated orientation of the dot matrix pixel arrangement 90 is stored in the memory of the computing device. Following the creation of the rotated orientation dot matrix pixel arrangement 90, the dot matrix pixel arrangement 90 is output normally to a printing device to yield the composite multi-frame image 20 orientation that is rotated at an angle with respect to the X-Y axis of the printer as described herein, step 5, S5. Step 6, S6 consists of printing the lenticular print 100 on a suitable printing substrate 22 utilizing the printing device.

Within the scope of the present invention it is further contemplated if the rotated dot matrix pixels of the printed pixels are replaced with light sensitive pixel elements such as CCD pixel or CMOS pixel array, it will form a thin and simple structure, high angular resolution of detector that can detect the light signal direction easily. Furthermore, if future elaboration of the device of light sensitive pixels into big number of array, it will form a simple 3D imaging device system that automatically capture corresponding angular information from different incident angle, and eliminate the need of using multiple camera position to capture 3D image, i.e. it will forms a flat panel 3D imager.

As shown in particular in FIG. 8, with the given rotation angle, mathematically, a rotated line connecting the integer Cartesian coordinates pixel grid set {(0,No), (n,No+m), (2n, No+2m), (3n, No+3m), . . . }, with offset of n and m pixel respectively to X- and Y direction, will take samples from the first frame of the series of frames and place in the "rotated" dot matrix pixel arrangement where n, m are integer with no common factorization between them, and n=<m. Thus the line direction forms a mathematical rotated angle with respect to Y axis, and is equal to Arctangent (n/m) if the pixel pitches of printer in horizontal an vertical direction are substantially equal. And the next closest grid points to this first frame line when connection together form a parallel line and is taking samples from the second frame, and then the process keep repeat to from the 3 frame sample points, And then keep using the parallel next closest points as for the next frame until the Nth frame, and finished the first group of pixel under the first lenticular element. Then the next closest point of line will be back to taken from the first frame, and repeat the process for the second group of lenticular element. These process keep going until finish the whole range of width and create the final rotated composite image consist of N frames.

Still referring to FIG. 8, illustrated line 850 represents the horizontal orientation of the composite image individual component frames. Illustrated line 820 represents the vertical orientation of the composite image and individual component frames. The vertical lines 899 and horizontal lines 898 represent the native pixel grid line formed by the printer in X-Y direction and the intersect points are the centers 897 wherein pixels 880 can be placed. Additionally, as illustrated in FIG. 8, the pixel points from the first frame form the line 820 with a rotated angle θ against the Y-axis where tan θ=(n/m)*(ΔX/ΔY). Line 810 illustrates the closest grid points to the second line 815 forming a third line 820 parallel with the second line 815 taking pixel samples from the third frame 830. The second line 815 illustrates the closest grid points to the first line 810 forming a second line 815 parallel with the first line 810 taking pixel samples from the second frame 835. A legend for FIG. 8 is as follows: the solid circles, reference numeral 840 are the pixels printed on the grid 890 taken from the first captured frame. The solid circle with the hole, reference numeral 835, are the pixels taken from the second captured frame and the star symbol, reference numeral 830 are the pixels taken from the third captured frame. For the exemplary illustration in FIG. 8, n does not need to be equal to 1. Those skilled in the art will recognize that the embodiment of the present invention discussed herein can be utilized to create a higher quality three dimensional lenticular print to be utilized to create 3D imaging, animation of graphics, morphing, zoom effects, rotational effects and motion effects. Additionally but not by way of limitation, it is contemplated within the scope of the present invention that the embodiment discussed herein could be utilized to create a distance gauge or parking aid. More specifically but not by way of limitation, the use of the high angular resolution lenticular print as a garage parking aid/distance gauge. The driver when moving along the drive way entering a parking garage, will see the information gauge sign continuously changing messages according to the driver's current position zone relative to the parking aid/distance guide to direct the driver to park their vehicle in the desired and most appropriate location. This parking aid/distance gauge lenticular sign having been printed in accordance with the present invention can contain N frames (N is at least 2 or far more than 2) of information that consist of any combination of text, graphics, rotational gauge, bar graph visible to the viewer so as to provide information appropriate to his current zone or position. The operational principle is based on the fundamental that the lenticularly printed parking aid/distance gauge sign is in a position and angle so that the when the viewer enters in a specific route or area, the viewer's eyes are positioned within a controlled zone, so that when the viewer sees the parking aid/distance gauge, the angle to normal of the lenticular surface center is different when the viewer moves to different location or zone and a specific frame of the parking aid/distance gauge sign is designed to reveal the corresponding information to the viewer only when the viewer is within the control zone. This lenticular parking aid/distance gauge sign can also be used as a visual sign for a traffic safety warning device when attached to the back of the proper position of a vehicle below or above the eye level of a driver. Exemplary suggested position could be but not limited to be the license plate level of a vehicle. In this arrangement, the information frame can be created to display indicia such as but not limited too, "Your are Too Close", "Keep a longer safe distance". Alternatively, when the driver views the parking aid/distance gauge sign from a high angle from the normal surface of the lenticular sheet and when the driver views the parking aid/distance gauge sign from a greater distance than the angle from the normal of the lenticular parking aid/distance gauge sign is smaller, and the could display the indicia, "Great, you are in good distance. It is further contemplated within the scope of the present invention that an additional application of the present invention could be to create a sundial based on a lenticular print printed in accordance with the present invention. More specifically but not by way of limitation, if the lenticular element has an axial direction in a true north and south direction and a proper pattern of corresponding frames with information of the time as a function of illumination angel are printed on a substrate, an exemplary lenticular print could be used to create a sundial.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of producing a lenticular print wherein the lenticular print is produced such that progressive pixel misalignment is substantially eliminated comprising the steps of:

capturing a plurality of frames a subject, wherein each of said plurality of frames contains an image of the subject at a different planar angle with respect to each other;

transferring said plurality of frames to a computing device;

converting, with the computing device, said plurality of frames into a multi-frame composite image;

translating said multi-frame composite image into a rotated dot matrix pixel arrangement with the dot matrix pixel arrangement having a pixel direction;

printing the rotated dot matrix pixel arrangement onto a suitable printing substrate; overlaying a plurality of lenticular elements over the printed dot matrix pixel arrangement on the printing substrate such that the axis of each of the plurality of lenticular elements are in substantial alignment with the axis of the pixel direction and wherein said dot matrix image pixel arrangement is printed on said print substrate at an angle greater than zero degrees and less than or equal to 10 degrees with respect to the horizontal and vertical alignment of the output of the printer.

2. The method as recited in claim 1, wherein the effective resolution of the output of the printer is increased by rotating said dot matrix pixel arrangement on said print substrate with respect to the horizontal and vertical alignment of the output of the printer.

3. The method as recited in claim 2, wherein the interframe pixel pitch of said rotated dot matrix pixel arrangement is less than that of a printed output of a dot matrix pixel arrangement that is in substantial alignment with the horizontal and vertical axes of the printer.

4. The method as recited in claim 3, wherein each of said plurality of lenticular elements has a pitch and further wherein said dot matrix image pixel arrangement has a pitch and further wherein the pitch of said dot matrix image pixel arrangement is balanced with respect to the pitch of said lenticular elements to produce a balanced resolution of the lenticular print.

5. The method as recited in claim 4, wherein the lenticular print is utilized to create at least one of the following: a three dimensional image, a print having animation of graphics, a print having morphing effects, a print having zoom effects, a print having rotational effects, a print having motion effects, a sign directing a driver of a vehicle or a sundial.

* * * * *